(12) United States Patent
Pany et al.

(10) Patent No.: US 8,996,604 B2
(45) Date of Patent: Mar. 31, 2015

(54) DISTRIBUTED SYMBOL TABLE WITH INTELLIGENT LOOKUP SCHEME

(75) Inventors: Sikta Pany, Orissa (IN); Smruti R. Sarangi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 12/717,601

(22) Filed: Mar. 4, 2010

(65) Prior Publication Data

US 2011/0219079 A1 Sep. 8, 2011

(51) Int. Cl.
  *G06F 15/16* (2006.01)
  *G06F 15/18* (2006.01)

(52) U.S. Cl.
  CPC ............. *G06F 15/16* (2013.01); *G06F 15/18* (2013.01)
  USPC ........................................................ 709/201

(58) Field of Classification Search
  USPC ........................................................ 709/201
  See application file for complete search history.

(56) References Cited

U.S. PATENT DOCUMENTS

| | | | | |
|---|---|---|---|---|
| 6,038,555 | A * | 3/2000 | Field et al. ..................... | 706/21 |
| 7,380,237 | B2 * | 5/2008 | Goring et al. ................. | 717/115 |
| 7,797,001 | B2 * | 9/2010 | Seligmann ................. | 455/456.3 |
| 2001/0037496 | A1 * | 11/2001 | Simonyi ......................... | 717/7 |
| 2002/0087586 | A1 * | 7/2002 | Yamagishi ................... | 707/203 |
| 2009/0316687 | A1 * | 12/2009 | Kruppa ......................... | 370/352 |
| 2009/0327505 | A1 * | 12/2009 | Rao et al. ..................... | 709/230 |
| 2010/0011060 | A1 * | 1/2010 | Hilterbrand et al. ......... | 709/204 |
| 2011/0010578 | A1 * | 1/2011 | Ag ndez Dominguez et al. ................................ | 714/4 |

OTHER PUBLICATIONS

Prasanna Ganesan, "Canon in G Major: Designing DHTs with Hierarchical Structure", 2004, p. 1-10.*

* cited by examiner

*Primary Examiner* — Ryan Jakovac
(74) *Attorney, Agent, or Firm* — Ference & Associates LLC

(57) ABSTRACT

In a larger-scale context such as that of a workflow system, a mechanism and a set of rules are for looking up a parameter in a hierarchical symbol table. In accordance with preferred embodiments of the invention, the approach is bottom-up, and uses rules defined in an arbitration table to determine a correct version of the parameter. A distributed design is broadly contemplated herein, wherein different symbol tables need not be disposed on one and the same machine. This can permit a greater degree of scalability and error tolerance.

21 Claims, 5 Drawing Sheets

DISTRIBUTED SYMBOL TABLE WITH INTELLIGENT LOOKUP SCHEME

BACKGROUND

Workflow systems, as generally known, comprise an ensemble of programs, and the programs communicate with each other by passing parameters. A parameter can represent any kind of data such as integers, strings and floating point values.

As also is generally known, a symbol table is a data structure that facilitates the process of inserting, searching, and modifying parameters. Symbol tables are extensively used in parallel systems, compilers, and other settings. Typically, a lookup scheme in the context of a symbol table is pre-set or fixed, and/or gives priority to local definitions. However, this presents a lack of flexibility that severely limits the applicability of such schemes (and symbol tables) to a broader range of contexts.

BRIEF SUMMARY

Broadly contemplated herein, in accordance with at least one embodiment of the invention, is a distributed symbol table arrangement in the context of a workflow system. The workflow system includes a set of processes that communicate with each other by exchanging parameters, whereby the parameters are stored in a distributed hierarchical symbol table. In accordance with preferred embodiments of the invention, in looking up values in the symbol table, the table is traversed bottom-up, and employs rules defined in an arbitration table to determine a correct version of a parameter. This idea can also be extended to create a generic specification that attaches subsidiary symbol tables to the main table.

Further contemplated herein, in accordance with at least one embodiment of the invention, is a mechanism which optimizes the communication of parameters across constituent processes in a workflow system in the form of an adaptive polling scheme. Such a scheme, in one embodiment, uses a multi-level machine learning-based perceptron learning algorithm, which can be implemented in hardware accelerators such as FPGAs (field-programmable gate arrays, i.e., integrated circuits that can be configured by consumers or designers after manufacturing). In one example embodiment, a receiver is registered as a poller either with a dedicated software process or with customized hardware like such as a FPGA. As can be appreciated, such an adaptive and intelligent polling mechanism can help free up resources at the receiver side until a parameter is generated. Also, in one embodiment the polling agent caches values of the parameter. This further optimizes the protocol by reducing unnecessary communication.

In summary, one aspect of the invention provides a method comprising: looking up a parameter at a first symbol table in a distributed network; looking up the parameter at a second symbol table in a distributed network, the second symbol table being disposed at a different location in the distributed network from the first symbol table, the first symbol table being a parent to the second symbol table in a hierarchical relationship; and transmitting a message from the location of the first symbol table to the location of the second symbol table upon looking up the parameter at the first symbol table.

Another aspect of the invention provides an apparatus comprising: one or more processors; and a computer readable storage medium having computer readable program code embodied therewith and executable by the one or more processors, the computer readable program code comprising: computer readable program code configured to look up a parameter at a first symbol table in a distributed network; computer readable program code configured to look up the parameter at a second symbol table in a distributed network, the second symbol table being disposed at a different location in the distributed network from the first symbol, the first symbol table being a parent to the second symbol table in a hierarchical relationship; and the computer readable program code further being configured to transmit a message from the location of the first symbol table to the location of the second symbol table upon looking up the parameter at the first symbol table.

An additional aspect of the invention provides a computer program product comprising: a computer readable storage medium having computer readable program code embodied therewith, the computer readable program code comprising: computer readable program code configured to look up a parameter at a first symbol table in a distributed network; computer readable program code configured to look up the parameter at a second symbol table in a distributed network, the second symbol table being disposed at a different location in the distributed network from the first symbol, the first symbol table being a parent to the second symbol table in a hierarchical relationship; and the computer readable program code further being configured to transmit a message from the location of the first symbol table to the location of the second symbol table upon looking up the parameter at the first symbol table.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
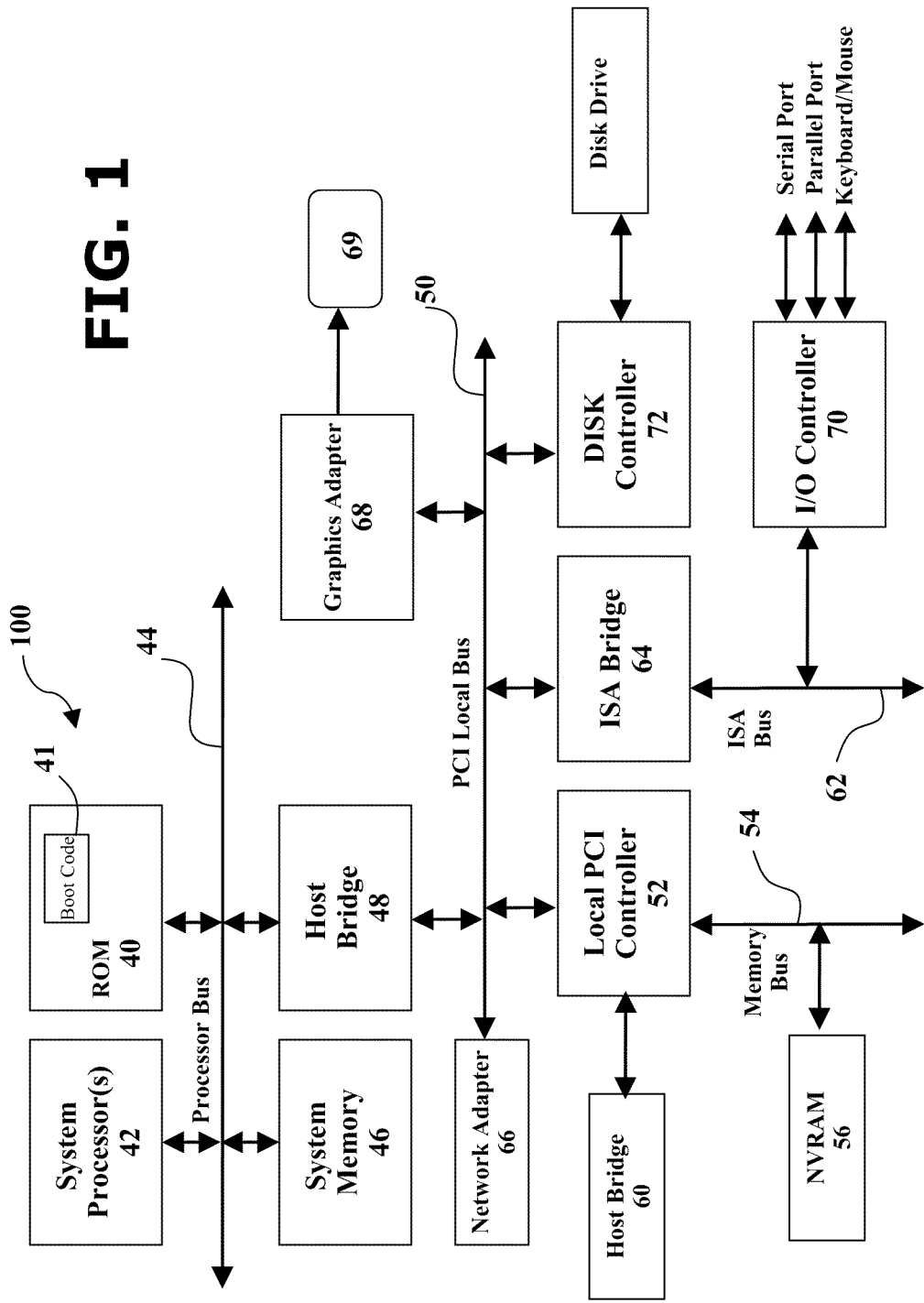
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

In accordance with at least one presently preferred embodiment of the present invention, a context of a workflow system is contemplated. A workflow system includes individual processes that read a set of named parameters, which are stored in a hierarchical symbol table. In one embodiment, a mechanism and a set of rules are provided for looking up values in the symbol table.

In the exemplary embodiment, the approach is bottom-up, and uses rules defined in an arbitration table to determine a correct version of the parameter. In general, and as will be better understood and appreciated herebelow, preference may be given to a global value as opposed to a local value. Rules can be customized and designed for an arbitration table and, in the case of something very critical one can decide not to override such conditions.

By way of further clarification, in accordance with embodiments of the invention, an auxiliary table is constructed, understood to be a "rule-table". In such illustrative an non-restrictive embodiments, the table has a format where one column refers to "parameter" and another column to "type". The "parameter" column contains names of parameters, while the "type" column contains values or references such as "local" or "ignore_current_table".

In one embodiment, by default a message is sent to the parent symbol table. However, if there exists an entry for the parameter in the rule table, then based on the parameter type, in accordance with the exemplary embodiment of the invention, the following may occur.

If "type" is "local", then the value of the parameter defined in the current symbol table is returned if the value is defined, and no message is sent to the parent symbol table. Thus, activity is constrained locally. On the other hand, if "type" is "ignore_current_table" then the current symbol table is not consulted. Instead, a lookup message (e.g., a prompt to perform a lookup operation) is sent to the parent symbol table.

In one embodiment, a distributed design exists, wherein different tables need not be disposed on one and the same machine. This can be particularly advantageous in a setting where a large number of tools need to be run, e.g., in connection with a large-scale experiment. As will be appreciated throughout the discussion here, the use of one centralized symbol table is avoided and obviated, thus leading to greater efficiency and operability. As will also be appreciated herein, this can permit a greater degree of scalability and error tolerance. As will be understood and appreciated herein, in accordance with at least one embodiment of the invention, different symbol tables will communicate by passing messages.

Figure 2:
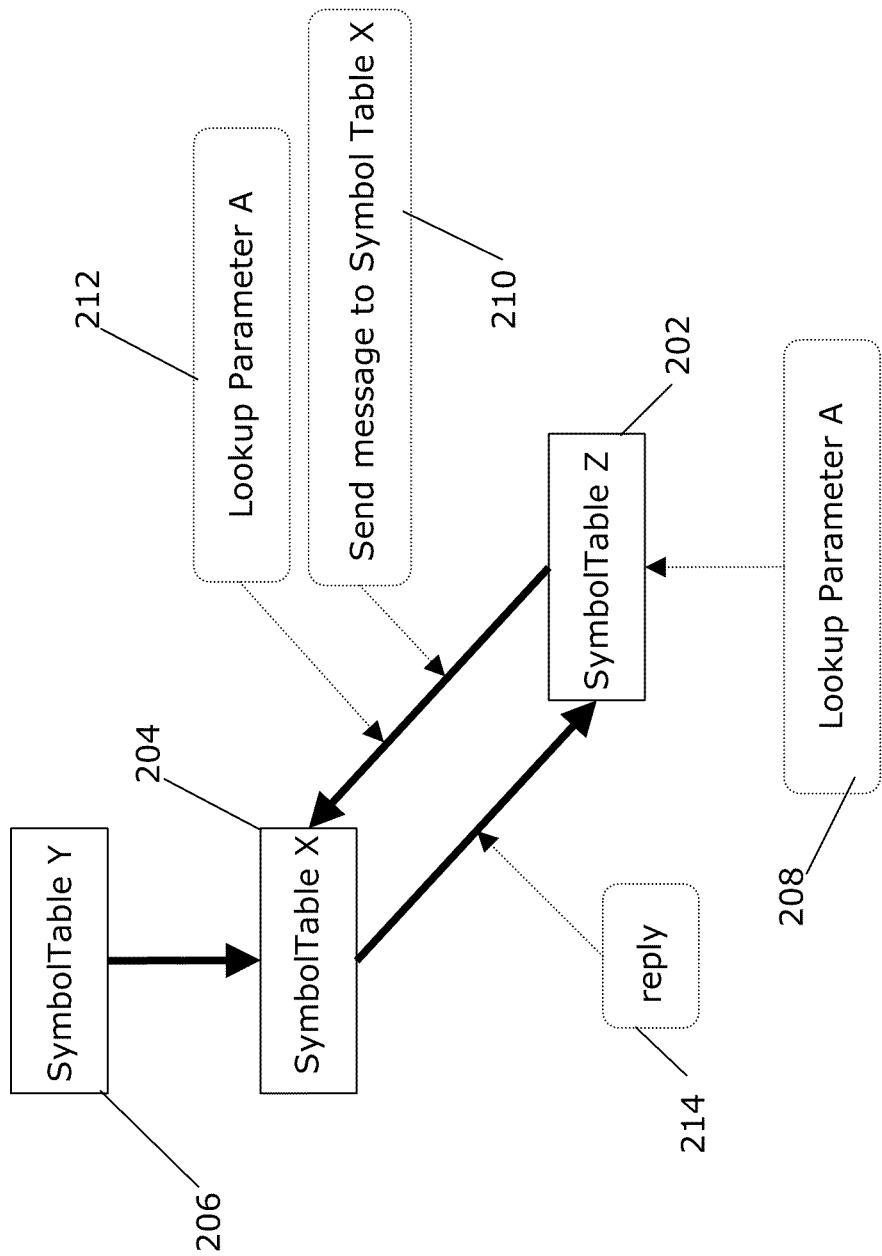
FIG. 2 schematically illustrates a distributed environment with different machines containing different symbol tables.

Turning to the remaining Figures, FIG. 2 schematically illustrates a distributed environment with different machines containing different symbol tables. As schematically illustrated in FIG. 2, symbol tables Z, X and Y, respectively, 202/204/206, may be present on different machines in such a distributed environment. Any and all such machines may be embodied by essentially any suitable system, such as (but by no means limited to) a system such as that indicated at 100 in FIG. 1. Here, the symbol tables Z/X/Y 202/204/206 may be understood as being arranged hierarchically as a tree, where Table X 204 is a parent to each of Tables Z and Y 202/206.

Generally, in accordance with at least one preferred embodiment of the invention, an algorithm is applied such that a process (i.e., an execution of a tool) first searches for a desired parameter in its local symbol table. In the example of FIG. 2, this initial local symbol table is Table Z (202). The process then searches for the parameter in the parent of the local symbol table, and then in any parent of that parent, etc. In one embodiment, this process continues until there are no more parents left. In the example of FIG. 2, then, a search is made in Table X (204) after it is made in Table Z (202), as Table X (202) is the parent of Table Z (202).

If, by way of illustrative and non-restrictive example, a parameter named "A" is to be looked up, a problem can be encountered in which A is present in two different symbol tables. As shown FIG. 2, accordingly, A might be looked up and found (208) in Table Z 202 and also (212) then in parent Table X (204). In this example embodiment, once A is looked up/found (208) in Table Z 202, a message is sent (210) from Table Z 202 to Table X 204. In a reply (214) from Table X 204 to Table Z 202, a long name as explained below, or at least instructions to create a long name, are conveyed.

In accordance with at least one preferred embodiment of the invention, in order to uniquely address parameter A in the different symbol tables, the name of the symbol may be prepended to the parameter. Thus, parameter A in parent Table X (204) can be referred to as X.A while in child or local table Z (202), can be referred to as X.Z.A. In the present discussion, "A" can be thought of as a "short name" while X.A and X.Z.A can be thought of as long names. While the form of nomenclature for long names can take essentially any suitable form, it can be appreciated here that such names, in a preferred embodiment, indicate a chain of parent-child relationships if any such chain exists; thus, in such an example embodiment, X.A refers to parameter A in the parent table in the present example, while X.Z.A refers to parameter A as found in the local Table Z, which itself is a child of Table X.

If, as in the example contemplated herein above and in FIG. 2, multiple copies of a parameter are indeed present among different symbol tables, then in accordance with a preferred embodiment of the invention an arbitration takes place between the long and short names. In other words, there may be instances where long names might not even be needed and arbitration could resolve in favor of the short name. For example, in a first scenario, an experiment might be defined wherein all parameters with the name "A" are to have the same value. In such a case, it would be sufficient to just define A in a top level symbol table. However, if it happens that A is defined in a lower level symbol table as well, then an order of preferences would need to be set correctly, e.g., with long names being established.

In a second scenario, on the other hand, it could be assumed that there are two parameters with name A, one each in the symbol tables Y (206) and Z (202). However, instead of carrying the same value or meaning the same thing, they would carry different values or mean different things. In the present example, values X.Y.A and X.Z.A are thus set in the symbol table X 204 if there is no intent to set values in local symbol tables Y or Z (206/202). This can be useful if symbol tables Y and Z (206/202) are pluggable modules and their structure can't be modified. Thus, the long name would take preference over any other name in this scenario.

Generally, to formalize a nomenclature and arbitration scheme as discussed hereabove, in a preferred embodiment a rule-table is established with each of the symbol tables. By way of alternatives, each rule-table could be parameter-specific, or could be symbol table-specific. Either way, a rule-table is configured to specify rules for arbitration.

In accordance with at least one preferred embodiment of the invention, a rule-table may be constructed such that whenever a long name is encountered, the search is terminated at that point and no message is sent. For instance, let it be assumed (for purposes of non-restrictive illustration) that three symbol tables are organized in a tree as follows: A→B→C. In other words, A is the parent of B, and B is the parent of C. If a parameter lookup is then initiated in C, then in accordance with preferred embodiments of the invention C sends a message to B. If B has the long name of the parameter defined, it does not send a message to A but instead sends the value of the parameter back to C.

In another embodiment, if multiple long names are defined in the chain of lookups, then an error is flagged. For example, if long names for the same parameter are defined in A and B, an error is flagged.

In the embodiments broadly contemplated in accordance with FIG. 2, symbol tables are used as media for synchronizing parallel tasks. In such a scenario, a receiver-initiated protocol is employed, where a receiver polls a sender for the availability of data. However, for a large system this might not be scalable, as a receiver may unnecessarily end up tying down resources. Accordingly, an interrupt driven scheme for a receiver would be desirable in such instances.

Figure 3:
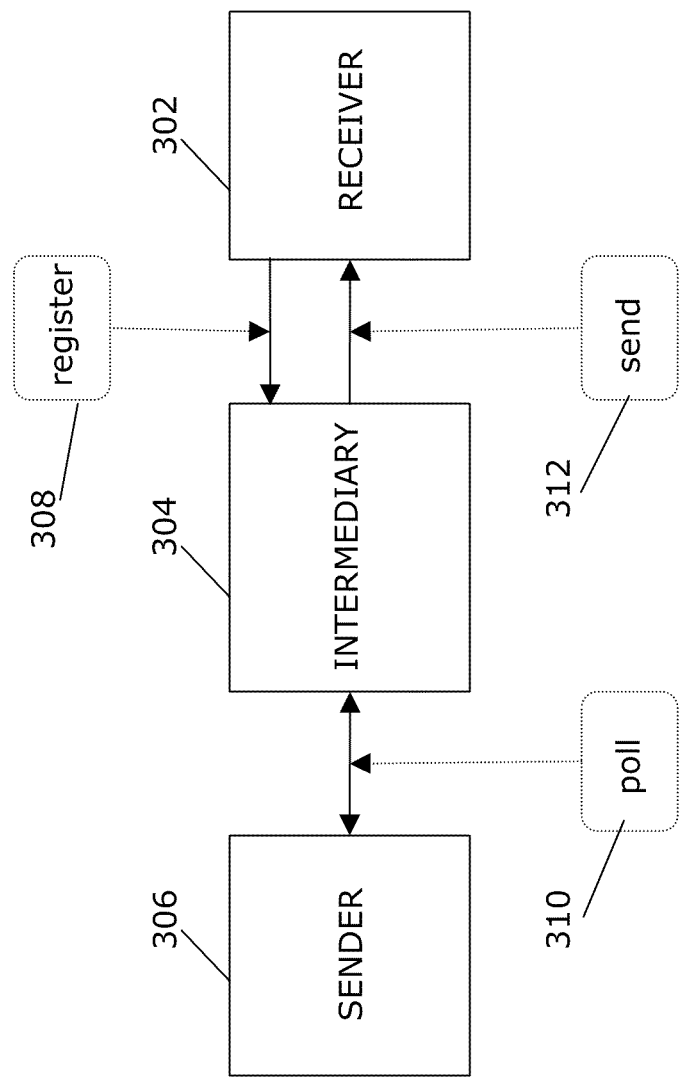
FIG. 3 schematically uses the use of an intermediate agent in which a sender can be polled.

Thus, FIG. 3 schematically uses the use of an intermediate agent in which a sender can be polled. As shown with regard to an illustrative embodiment, the intermediate agent, or intermediary 304, is communicatively interpositioned between the receiver 302 and sender 306. Each of the three elements just mentioned, the receiver, intermediary and sender 302/304/306, respectively, may be embodied by essentially any suitable system, such as (but by no means limited to) a system such as that indicated at 100 in FIG. 1.

In a preferred embodiment, receiver 302 registers itself (308) with the intermediary 304, and the intermediary 304 thence informs the receiver 302 once a requested parameter is ready. Particularly, the intermediary 304 polls (310) the sender 306 and, if indeed the parameter is ready, intermediary 304 then sends (312) a notification regarding same to receiver 302. Accordingly, intermediary 304 serves here as a machine dedicated to polling a sender 306, and this dedicated poller frees up the receiver 302 to run other tasks. Especially in a context such as a workflow system, where latency is not usually as big a concern as throughput, an arrangement such as that broadly contemplated in accordance with FIG. 3 can be highly advantageous.

In accordance with a preferred embodiment of the invention, a dedicated polling agent (such as an intermediary 304 as shown in FIG. 3) also employs sophisticated algorithms. The extra resources provided by a dedicated polling agent permit such flexibility, whereas an overburdened receiver (without the help of a dedicated polling agent) would likely not be able to provide such capabilities.

By way of non-restrictive and illustrative alternatives, one type of sophisticated polling mechanism involves implementation in software, and another involves the use of FPGAs In accordance with at least one embodiment of the present invention, better learning algorithms are broadly contemplated, whereby, e.g., a polling interval can be accurately predicted. As such, a multi-level perceptron (MLP) learning algorithm is employed in accordance with a preferred embodiment of the invention, as will be better appreciated further below.

In an illustrative embodiment of the invention, each receiver registers itself as a poller in a symbol table and its corresponding information is recorded (ID of the receiver and name of the parameter) and then the poller then executes in the FPGA or in software (as appropriate). Hundreds of pollers can simultaneously be executed and, in each poller, a MLP algorithm is used to obtain an optimal polling interval. (For background purposes, salient aspects of perceptron algorithms that may be employed in accordance with embodiments of the invention may be found in U.S. Pat. No. 5,121,228 to Paek, "Holographic Learning Machine", which patent is hereby fully incorporated by reference as if set forth in its entirety herein.)

At that point, in accordance with a preferred embodiment of the invention, every time a poller is run, it adjusts itself to this optimal polling interval. After polling is complete, in the present example a message is sent to the receiver with the name and value of the parameter. In the case of parallel systems, all this can be of great help in increasing the system's efficiency and productivity.

Figure 4:
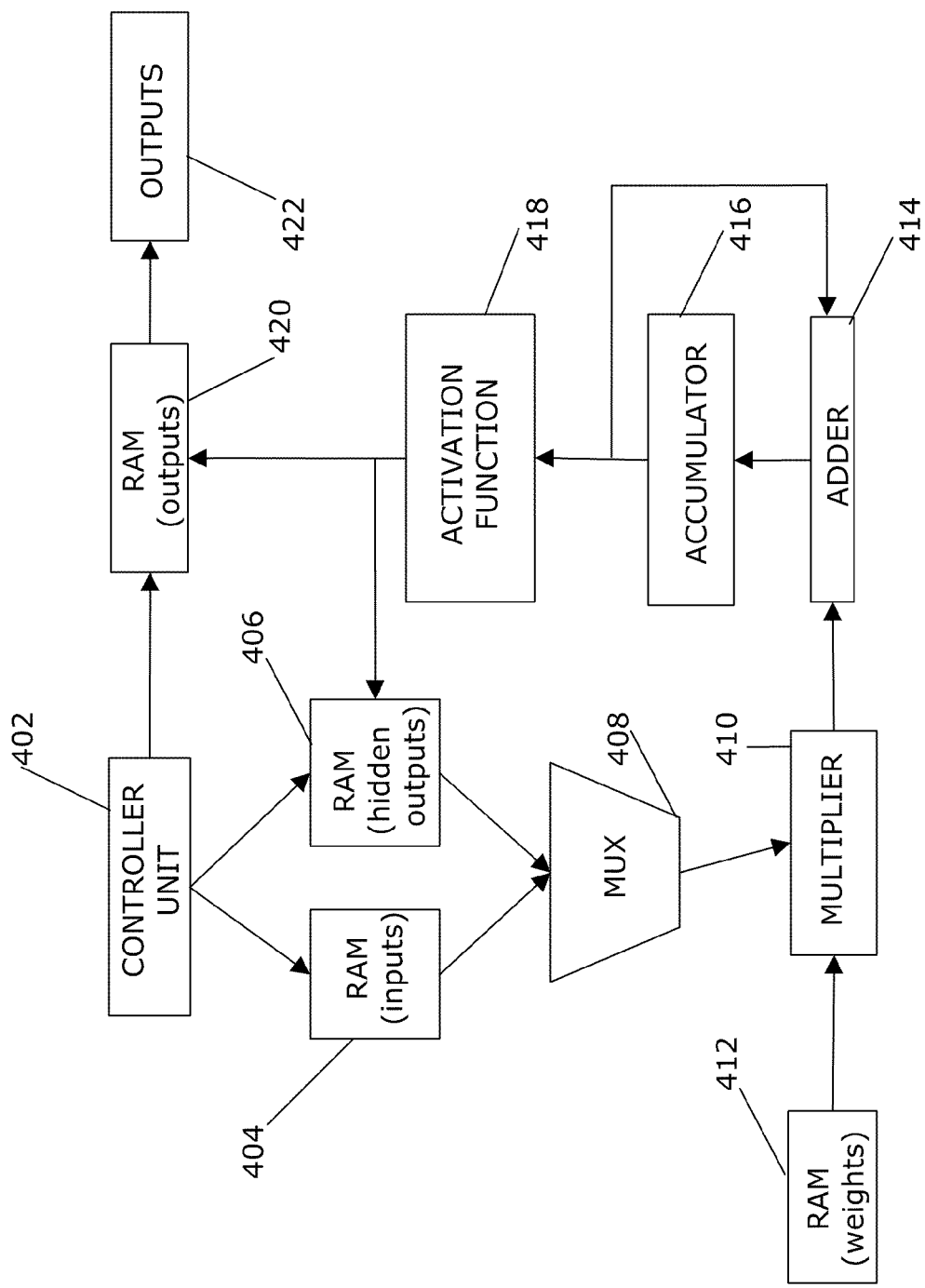
FIG. 4 schematically illustrates components, and a process associated therewith, which in an embodiment of the invention are employed in a symbol table-based intelligent polling scheme as implemented in a FPGA.

FIG. 4 schematically illustrates components, and a process associated therewith, which, in accordance with an illustrative and non-restrictive embodiment of the invention, are be employed in a symbol table-based intelligent polling scheme as implemented in a FPGA, and which can thus help accelerate system performance. An FPGA can also present advantages in that, given the relatively simple and repetitive tasks involved, the resources of a superscalar processor would not be required. Further, FPGAs are configurable to employ up to dozens of polling agents thereon, thus providing a cheap alternative in the context of a large system.

In accordance with a preferred embodiment of the invention, whenever a receiver is registered as a poller in a symbol table (as described in illustrated in FIG. 3), then polling starts in the FPGA with a MLP algorithm running. Accordingly, FIG. 4 schematically illustrates, in accordance with a preferred embodiment, a FPGA implementation of a MLP algorithm, wherein each polling iteration provides learning for the intelligent algorithm at hand.

Figure 5:
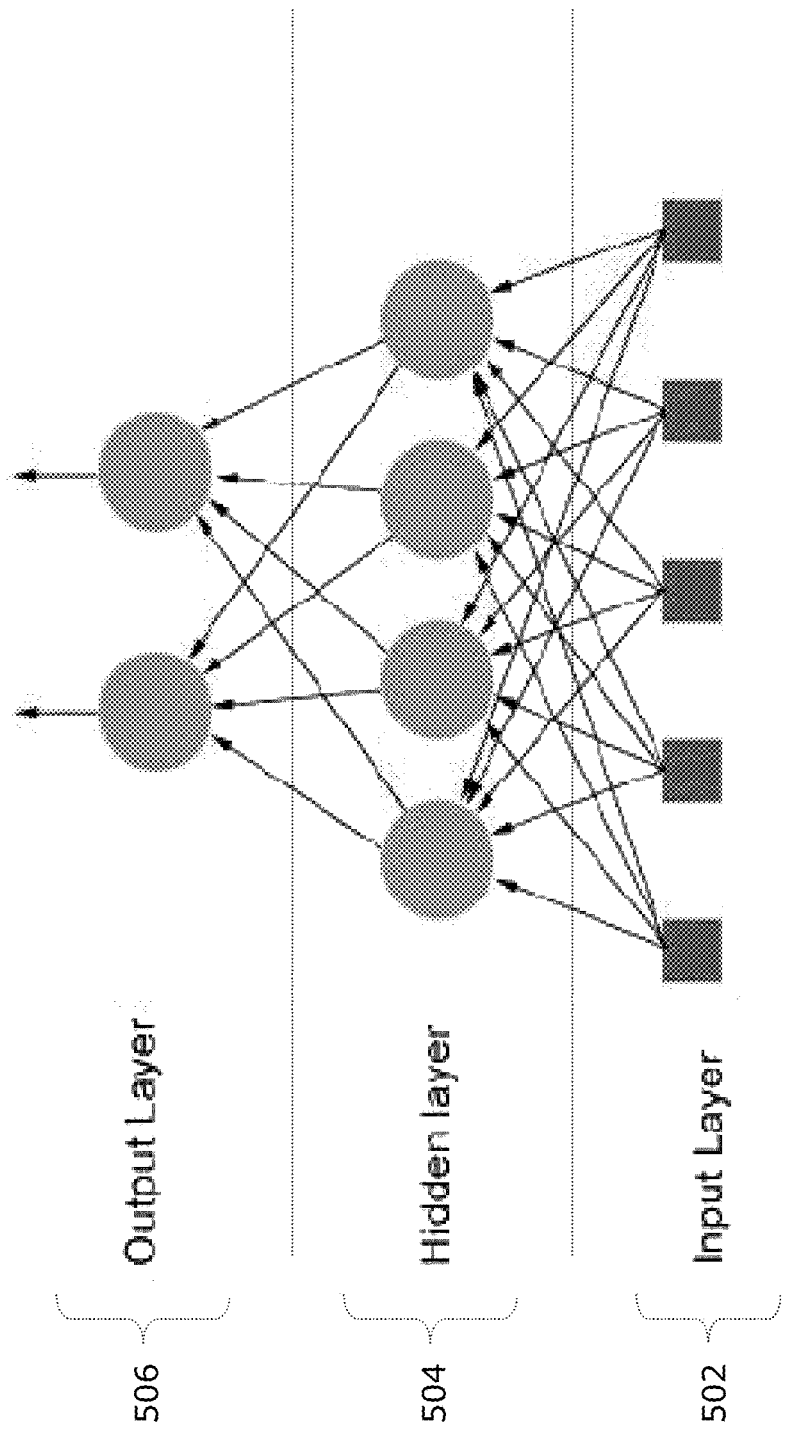
FIG. 5 schematically illustrates elements involved in a basic perceptron algorithm.

In the present illustrative example, the implementation is divided into a functional unit which undertakes the basic computation of input layers and hidden layers as per an activation function 418. Essentially any suitable activation function may be employed, but for simplicity, in accordance with a preferred embodiment, a sigmoid activation function is used. FIG. 5, for its part, schematically illustrates elements involved in a basic perceptron algorithm, wherein a hidden layer 504 is functionally interpositioned between an input layer 502 and an output layer 506. In other words, inasmuch as a MLP as employed herein accepts inputs and transforms the same into outputs, a "hidden" layer 504 involving intermediate calculations can assist in transitioning between the input layer 502 and output layer 506.

Returning now to FIG. 4 all inputs (404), outputs from hidden layers (406) and final outputs (420) are stored in RAM models. In the present example, a finite state machine based controller 402 is configured to control process flow at specific intervals. After RAM inputs 404 and RAM hidden outputs 406 are input into a multiplexer 408, weights 412 are incorporated at a multiplier 410 to result in weighted inputs. The weighted inputs are summed up at adder 414 and accumulated in the accumulator 416, thence fed into the activation function 418 to yield the final RAM outputs 420 (thereby prompted by controller unit 420 to proceed onward as outputs 422). Also, in this illustrative embodiment, activation function 418 also yields hidden outputs 406 to restart the process cycle. For simplicity here one hidden layer is considered (e.g., as indicated at 504 in FIG. 5), but, in accordance with variant embodiments of the invention, arrangements with more than one hidden layer are employed, such as two hidden layers.

In accordance with illustrative and non-restrictive embodiments of the present invention, the following activation function is employed:

$$\phi(y_i) = \tan h(v_i),$$

where $y_i$ is the output of an ith node and $v_i$ is the weighted sum of input synapses.

In recapitulation, it will be appreciated that the arrangements and processes broadly contemplated herein would be particularly advantageous in the context of systems that integrate a large number (e.g., thousands) of third party tools and run the same. This would require a large symbol table which, as can be appreciated, can easily be incorporated in a distributed environment as contemplated herein.

In further recapitulation, there is broadly contemplated herein, in accordance with at least one presently preferred embodiment of the present invention, and in a large-scale context such as a workflow system, the employment of a distributed symbol table. Also broadly contemplated herein is a customized symbol lookup scheme that uses rule based tables in an arbitration scheme.

Further contemplated herein is the use of a software-based intermediary to poll parameters. Particularly, in accordance with such an embodiment of the invention, once a parameter has been generated by a producer, the intermediary notifies the receiver. An intelligent poller is contemplated herein, particularly one that uses AI-based (artificial intelligence-based) algorithm. Additionally contemplated herein is a FPGA implementation of such a poller.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
looking up a parameter at a first symbol table in a distributed network;
looking up the parameter at a second symbol table in a distributed network, the second symbol table being disposed at a different location in the distributed network from the first symbol table, the second symbol table being a parent to the first symbol table in a hierarchical relationship;
transmitting a message from the location of the first symbol table to the location of the second symbol table upon looking up the parameter and finding a first version of the parameter at the first symbol table; and
upon finding a second version of the same parameter at the second symbol table, arbitrating to determine usage of one of the parameter versions, said arbitrating including consulting an arbitration rules table and applying at least one rule from the arbitration rules table to determine a correct version of the parameter;
associating a receiver with at least one of the first and second symbol tables;
associating a sender with at least one of the first and second symbol tables;
employing an intermediary to look up the parameter, the intermediary being functionally interposed between the receiver and the sender, and functioning in accordance with a multi-level perceptron algorithm; and
employing the intermediary to poll the sender for the parameter.

2. The method according to claim 1, further comprising transmitting a message from the location of the second symbol table to the location of the first symbol table upon looking up the parameter at the second symbol table.

3. The method according to claim 2, wherein said transmitting of a message from the location of the second symbol table to the location of the first symbol table comprises transmitting a message from the location of the second symbol table to the location of the first symbol table upon looking up and finding the parameter at both of the first and second symbol tables.

4. The method according to claim 1, wherein the first and second symbol tables are disposed at different machines in the distributed network.

5. The method according to claim 1, wherein the distributed network accommodates a workflow system, and locations in the distributed network are connected via the workflow system.

6. The method according to claim 1, further comprising generating different names to the parameter.

7. The method according to claim 6, wherein said generating comprises generating a short name and a long name, the short name being shorter than the long name.

8. The method according to claim 7, wherein said generating of a short name comprises generating a general name for the parameter.

9. The method according to claim 7, wherein said generating of a long name comprises generating a long name which indicates the symbol table at which the parameter has been looked up.

10. The method according to claim 9, wherein the long name indicates the symbol table at which the parameter has been looked up along with a parent of the symbol table at which the parameter has been looked up.

11. The method according to claim 7, wherein said at least one rule comprises a rule to determine whether to assign a short name or a long name to the parameter.

12. The method according to claim 1, wherein the intermediary is software-based.

13. The method according to claim 1, further registering the receiver with the intermediary.

14. The method according to claim 1, wherein said polling comprises polling the sender for the parameter at predetermined intervals.

15. The method according to claim 1, wherein said polling comprises polling the sender for the parameter at dynamically determined intervals.

16. The method according to claim 1, further comprising notifying the receiver upon the parameter being found at the sender.

17. The method according to claim 1, wherein the intermediary is implemented in a field-programmable gate array.

18. An apparatus comprising:
one or more processors; and
a computer readable storage medium having computer readable program code embodied therewith and executable by the one or more processors, the computer readable program code comprising:
computer readable program code configured to look up a parameter at a first symbol table in a distributed network;
computer readable program code configured to look up the parameter at a second symbol table in a distributed network, the second symbol table being disposed at a different location in the distributed network from the first symbol the second symbol table being a parent to the first symbol table in a hierarchical relationship;
said computer readable program code further being configured to transmit a message from the location of the first symbol table to the location of the second symbol table upon looking up the parameter and finding a first version of the parameter at the first symbol table; and
upon finding a second version of the same parameter at the second symbol table, said computer readable program code further being configured to arbitrate to determine usage of one of the parameter versions, said arbitrating including consulting an arbitration rules table and applying at least one rule from the arbitration rules to determine a correct version of the parameter;
said computer readable program code further being configured to:
associate a receiver with at least one of the first and second symbol tables;
associate a sender with at least one of the first and second symbol tables;
employ an intermediary to look up the parameter, the intermediary being functionally interposed between the receiver and the sender, and functioning in accordance with a multi-level perceptron algorithm; and
employ the intermediary to poll the sender for the parameter.

19. The apparatus according to claim 18, wherein said computer readable program code is further configured to transmit a message from the location of the second symbol table to the location of the first symbol table upon looking up the parameter at the second symbol table.

20. The apparatus according to claim 18, wherein said computer readable program code is further configured to generate different names to the parameter.

21. A computer program product comprising:
a non-transitory computer readable storage medium having computer readable program code embodied therewith, the computer readable program code comprising:
computer readable program code configured to look up a parameter at a first symbol table in a distributed network;
computer readable program code configured to look up the parameter at a second symbol table in a distributed network, the second symbol table being disposed at a different location in the distributed network from the first symbol the second symbol table being a parent to the first symbol table in a hierarchical relationship;
said computer readable program code further being configured to transmit a message from the location of the first symbol table to the location of the second symbol table upon looking up the parameter and finding a first version of the parameter at the first symbol table; and
upon finding a second version of the same parameter at the second symbol table, said computer readable program code further being configured to arbitrate to determine usage of one of the parameter versions, said arbitrating including consulting an arbitration rules table and applying at least one rule from the arbitration rules to determine a correct version of the parameter;
said computer readable program code further being configured to:
associate a receiver with at least one of the first and second symbol tables;
associate a sender with at least one of the first and second symbol tables;
employ an intermediary to look up the parameter, the intermediary being functionally interposed between the receiver and the sender, and functioning in accordance with a multi-level perceptron algorithm; and
employ the intermediary to poll the sender for the parameter.

* * * * *